(12) United States Patent
Kelly et al.

(10) Patent No.: US 9,534,303 B2
(45) Date of Patent: Jan. 3, 2017

(54) HIGH PRESSURE ELECTROLYSIS CELL FOR HYDROGEN PRODUCTION FROM WATER

(75) Inventors: Nelson A. Kelly, Sterling Heights, MI (US); Thomas L. Gibson, Washington Township, MI (US); David B. Ouwerkerk, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1440 days.

(21) Appl. No.: 12/433,214

(22) Filed: Apr. 30, 2009

(65) Prior Publication Data

US 2010/0276299 A1 Nov. 4, 2010

(51) Int. Cl.
| | | |
|---|---|---|
| *C25D 1/04* | (2006.01) | |
| *C25D 1/12* | (2006.01) | |
| *C25D 1/10* | (2006.01) | |
| *C25B 1/12* | (2006.01) | |
| *C25B 9/08* | (2006.01) | |
| *C25B 1/10* | (2006.01) | |
| *C25B 9/00* | (2006.01) | |

(52) U.S. Cl.
CPC . *C25B 1/12* (2013.01); *C25B 1/10* (2013.01); *C25B 9/00* (2013.01); *C25B 9/08* (2013.01); *Y02E 60/366* (2013.01)

(58) Field of Classification Search
USPC .................. 205/350, 628, 633, 637; 204/260
See application file for complete search history.

(56) References Cited

U.S. PATENT DOCUMENTS

| | | | | |
|---|---|---|---|---|
| 6,896,789 | B2 * | 5/2005 | Ross | 205/633 |
| 7,326,329 | B2 * | 2/2008 | Gomez | 205/630 |
| 7,452,449 | B2 | 11/2008 | Weinberg et al. | |
| 2001/0050234 | A1 * | 12/2001 | Shiepe | 205/629 |
| 2004/0084325 | A1 * | 5/2004 | Weinberg et al. | 205/628 |
| 2006/0011489 | A1 * | 1/2006 | Swanepoel et al. | 205/345 |
| 2007/0151865 | A1 * | 7/2007 | Shimko et al. | 205/628 |
| 2007/0193885 | A1 * | 8/2007 | Benicewicz et al. | 205/637 |
| 2010/0000876 | A1 * | 1/2010 | Kirchoff et al. | 205/637 |

FOREIGN PATENT DOCUMENTS

| | | |
|---|---|---|
| CN | 1685083 A | 10/2005 |
| CN | 1751139 A | 3/2006 |
| DE | 19929579 A1 | 1/2001 |
| DE | 10123945 A1 | 11/2002 |

(Continued)

OTHER PUBLICATIONS

Chinese Decision on Rejection dated Nov. 2, 2012; Applicant: GM Global Technology Operations: Application No. 201010224008.8; 7 pages.

(Continued)

*Primary Examiner* — Nicholas A Smith
*Assistant Examiner* — Brian W Cohen
(74) *Attorney, Agent, or Firm* — BrooksGroup

(57) ABSTRACT

Exemplary embodiments include a method or apparatus for improving the electrolysis efficiency of high-pressure electrolysis cells by decreasing the current density at the anode and reducing an overvoltage at the anode while decreasing the amount of hydrogen permeation through the cell membrane from the cathode chamber to the anode chamber as the high-pressure electrolysis cell is operated.

9 Claims, 2 Drawing Sheets

(56) References Cited

FOREIGN PATENT DOCUMENTS

WO     2004015172 A2    2/2004
WO     2004076721 A2    9/2004

OTHER PUBLICATIONS

A solar-powered, high-efficiency hydrogen fueling system using high-pressure electrolysis of water :Design and initial results; Nelson A. Kelly, Thomas L. Gibson ,David B. Ouwerker ; www.sciencedirect.com, International Journal of Hydrogen Energy 33 (2008) 2727-2764. journal homepage :www.elsevier.com/locate/he.
Chinese Office Action dated Aug. 5, 2014; Application No. 201010224008.8 ; Applicant: BorgWarner ; 5 pages.
German Office Action dated Jun. 10, 2015; Application No. 102010018757.7; Applicant: BorgWarner ; 6 pages.

\* cited by examiner

HIGH PRESSURE ELECTROLYSIS CELL FOR HYDROGEN PRODUCTION FROM WATER

TECHNICAL FIELD

The field to which the disclosure generally relates includes an electrolyzer apparatus and method to produce high-pressure hydrogen by means of electrolysis of water.

BACKGROUND

Electrolysis of water is the decomposition of water ($H_2O$) into oxygen ($O_2$) and hydrogen gas ($H_2$) due to an electric current being passed through the water.

Conventional alkaline water electrolyzers operate by placing two electrodes in a bath of liquid electrolyte, such as an aqueous solution of potassium hydroxide (KOH). The electrodes, one being an anode and the other being a cathode, are separated from each other by a separation membrane, or cell membrane, that selectively allows passage of ions but not gas through it. When a voltage is applied across the electrodes, current flows through the electrolyte between the electrodes. Hydrogen gas is produced at the cathode and oxygen gas is produced at the anode. The separation membrane keeps the hydrogen and oxygen gases separated as the generated gas bubbles rise through the liquid electrolyte. The efficiency of such electrolyzers is mainly limited by the reaction evolving oxygen gas at the anode. Also, the high-pressure limit of these electrolyzers may be adversely affected by diffusion of hydrogen gas through the separation membrane and into the oxygen compartment, where it combines with oxygen in an exothermic reaction, wherein such generated heat may adversely affect one or more elastomeric components associated with the electrolyzer, including elastomeric hoses coupled to the gas outlets, which ultimately may lead to electrolyzer failure.

SUMMARY OF EXEMPLARY EMBODIMENTS OF THE INVENTION

Exemplary embodiments include methods and apparatuses for improving the electrolysis efficiency of high-pressure electrolysis cells by decreasing the current density at the anode and reducing an overvoltage at the anode while decreasing the amount of hydrogen permeation through the cell membrane from the cathode chamber to the anode chamber as the high-pressure electrolysis cell is operated.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The exemplary embodiments provide a method and apparatus for improving the electrolysis efficiency and hydrogen purity of high-pressure alkaline-electrolysis cells such as that shown in FIG. 1 by optimizing the electrolysis cell geometry.

Figure 1A:
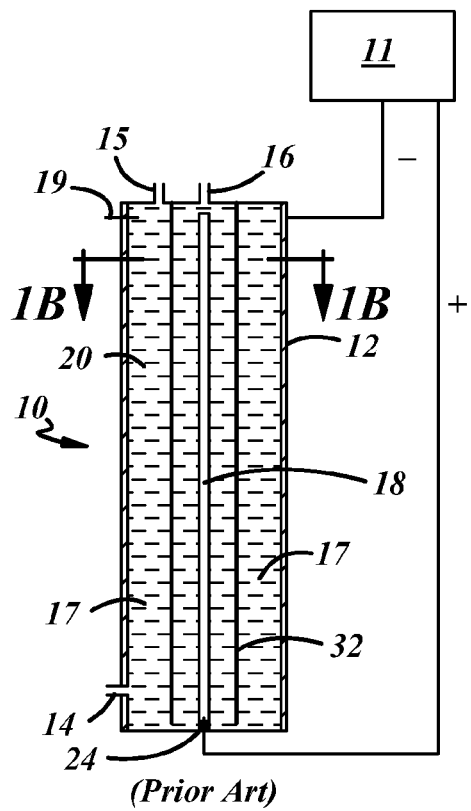
FIG. 1A is a schematic cutaway view of a electrolysis cell in accordance with the prior art.
Figure 1B:
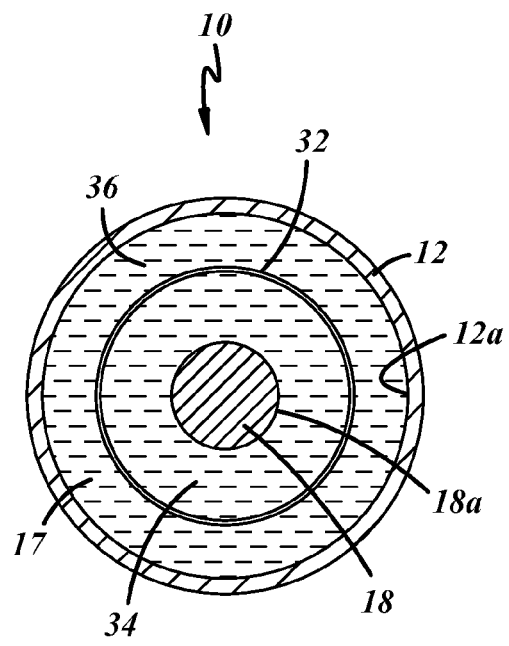
FIG. 1B is a top cutaway view of the electrolysis cell of FIG. 1A.
Figure 2A:
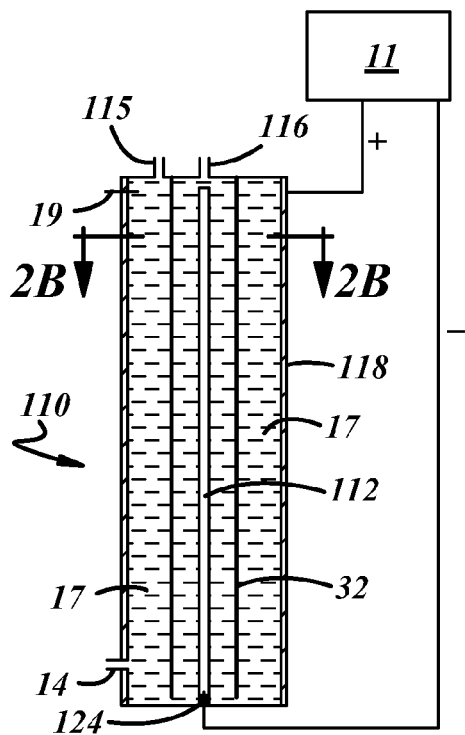
FIG. 2A is a schematic cutaway view of a electrolysis cell in accordance with one exemplary embodiment.
Figure 2B:
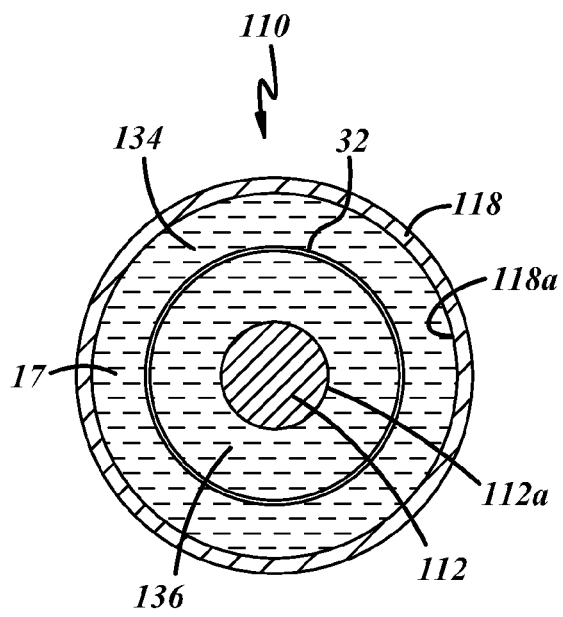
FIG. 2B is a top cutaway view of the electrolysis cell of FIG. 2A.

Referring first to FIG. 1, a schematic representation of a high-pressure alkaline-electrolysis cell 10 in accordance with the prior art and is generally patterned after U.S. Publication No. 2007/0151865 to Shimko et al., entitled "Electrolyzer Apparatus and Method for Hydrogen Production" and after an electrolyzer/storage/dispensing (ESD) device designed around a high pressure electrolyzer made by Avalence LLC of Milford, Conn., (the "Avalence Hydrofiller 50-6500-50RG system") which is described in the article "A solar-powered high-efficiency hydrogen fueling system using high-pressure electrolysis of water: Design and initial results (Nelson A. Kelly et al., International Journal of Hydrogen Energy 33 (2008), pp. 2747-2764). The cell 10, as illustrated in FIGS. 1A and 1B, is not intended to be an actual representation, but is merely meant to convey the general aspects of a cell 10, as will be used for comparison purposes to a cell 110 of an exemplary embodiment as will be described below with respect to FIGS. 2A and 2B.

The cell 10 may include an outer pressure vessel cylinder, which serves as a cathode 12, having a water inlet 14 leading to an interior portion 20, a hydrogen gas outlet 15 and an oxygen gas outlet 16. An electrolyte level sensor 19 may be coupled within the interior portion 20 that maintains the level of water entering the cell through the water inlet 14 at a desired level. A pump (not shown) may be electronically coupled to the electrolyte level sensor 19 and physically coupled water inlet 14 to aid in controlling the introduction of water into the interior portion 20.

A liquid electrolyte 17 is contained within the interior portion 20 that aids in increasing the electrical conductivity of the water. One exemplary liquid electrolyte 17 used in the high-pressure alkaline-electrolysis cell 10 may be a 28% by weight solution of potassium hydroxide (KOH) in water.

The cell 10 may also include a conductive center post, or anode 18, at least partially contained within the interior portion 20 of the cathode 12 and insulated from the cathode 12 with an insulator material 24. The cathode 12 and anode 18 may each be electrically coupled to each other via a direct current (DC) power source 11, through positive (shown as + on FIG. 1) and negative terminals (shown as − on FIG. 1), wherein the wiring for the anode 18 extends through the insulating material 24 so as not to contact the cathode 12 while creating the circuit. The cathode 12 includes an inner cylindrical surface 12a. Similarly, the anode 18 includes an outer cylindrical surface 18a, wherein the surface area of the inner cylindrical surface 12a is substantially greater than the surface area of the outer cylindrical surface 18a.

An annular cell membrane 32, typically made of plastic, separates the interior portion 20 into an inner compartment (i.e. an anode chamber) 34 and an outer compartment (i.e. a cathode chamber) 36, wherein the total volume of the inner compartment 34 is less than the total volume of the outer compartment 36.

The inner cylindrical surface 12a of the cathode 12 is where, in basic media, $H_2$ is produced via the reduction half reaction (Eq. 1):

$$2H_2O + 2e^- \rightarrow H_2 + 2OH^- \quad \text{(Eq. 1)}$$

The outer cylindrical surface 18a is where, in basic media, $O_2$ is produced via the oxidation half reaction (Eq. 2):

$$2OH^- \rightarrow \tfrac{1}{2}O_2 + H_2O + 2e^- \quad \text{(Eq. 2)}$$

Combining the half-reactions for the hydrogen evolution reaction (HER) and the oxygen evolution reaction (OER), results in the overall reaction (Eq. 3):

$$H_2O_{(l)} \rightarrow H_2 + \tfrac{1}{2}O_2 \quad \text{(Eq. 3)}$$

For the equations as above, water is in the liquid state (the $H_2$ and $O_2$ are gases under standard conditions, i.e. 25° C.).

A parameter for analyzing any electrolyzer apparatus, including the electrolysis cell 10, is its efficiency, in this case the efficiency with which the cell 10 converts electrical energy into the chemical energy of hydrogen and oxygen. Since only the chemical energy in the hydrogen is subsequently used as a fuel for hydrogen powered devices such as vehicles, the electrolyzer efficiency may simply be expressed as the chemical energy in the hydrogen. The electrolyzer efficiency is directly proportional to the operating voltage as expressed in Equation 4:

$$\text{Electric to hydrogen efficiency} = 100\% \times 1.254\,V \div [V_{oper}] \quad \text{(Eq. 4)}$$

wherein $[V_{oper}]$ is the electrolyzer operating voltage and 1.254 V is the LHV (lower heating value) of hydrogen (enthalpy for the reverse of the reaction in Eq. 3, but with gaseous water rather than liquid water production).

While the $H_2$ LHV is illustrated as being used in the numerator for Eq. 4 (1.254 V), the HHV (higher heating value) may alternatively be utilized in the numerator of Eq. 4 (1.485 V, the so-called thermo neutral voltage, which is the enthalpy for the reverse of the reaction in Eq. 3 at 25° C.). Alternatively, the Gibbs free energy (1.23 V) which is the chemical value of the hydrogen in an $H_2$—$O_2$ fuel cell at standard conditions, is often used in the numerator of the electrolysis efficiency equation. Any of the three values may be justified, and it is easy to interconvert efficiencies based on different standards as long as the standard is stated with the efficiency.

The electrolyzer operating voltage is a function of several variables, including the hydrogen production rate (current), the electrolyzer temperature, and the catalysis of the half reactions. The factors that reduce the electrolyzer efficiency (i.e. increase the electrolyzer operating voltage) are generally discussed as overvoltages—voltages over the ideal thermodynamic value.

There are many factors that may influence the overvoltage in an electrolyzer cell. The ideal thermodynamic limit for the water splitting voltage, 1.23 V at standard conditions (the Gibbs free energy), is never reached in practice because it is the "reversible" voltage, $V_{rev}$, for an infinitely slow process. In a real system, the water splitting voltage includes an overvoltage, $\eta$, due to kinetic effects, that is required to drive the reaction at a finite rate as shown in Equation 5:

$$V = V_{rev} + \eta \quad \text{Eq. 5}$$

The overvoltage, $\eta$, has three components. They are illustrated in Equation 6:

$$\eta = \eta_a + \eta_c + \eta_{ir} \quad \text{Eq. 6}$$

where $\eta_a$ is the activation overvoltage caused by rate limiting steps (activation energy barriers), $\eta_c$ is the concentration overvoltage caused by the decrease in concentration at the electrode surface relative to the bulk phase because of mass transport limitations, and $\eta_{ir}$ is the ohmic overvoltage caused mainly by resistance in the electrolyte and also at the electrode surfaces. The $\eta_{ir}$ term is minimized by using an electrolyte with the maximum conductivity. The $\eta_a$ term is minimized by using electrodes that catalyze the reactions of interest. The $\eta_c$ term is often minimized by stirring. Another way to minimize the overvoltage is to operate at lower current density; at low current density both $\eta_a$ and $\eta_c$ will be reduced since is requires less energy to drive the system through rate-limiting steps and the concentration overvoltage will be reduced. At zero current the potential difference (voltage) across two electrodes in an electrochemical cell is equal to the reversible potential, $V_{rev}$, i.e., there is no overvoltage (this is the thermodynamic limit for the system).

The exemplary embodiments herein provide a method and apparatus for improving the electrolysis efficiency and hydrogen purity of a high-pressure alkaline-electrolysis cell, such as the electrolysis cell 10 shown in FIG. 1, by optimizing the electrolysis cell geometry. The new geometry may lower the current density on the anode (the anodic oxygen evolution is the rate limiting step in water electrolysis) and decrease the overvoltage on the anode, leading to increased efficiency. The new geometry may also reduce hydrogen gas permeation through the cell membrane and into the oxygen produced at the anode, a phenomenon that may lead to electrolysis cell failure due to "burning" of the hydrogen in nearly pure oxygen. Lowering the hydrogen concentration in the oxygen may allow the electrolyzer cell to safely achieve higher pressures than conventional electrolysis cells 10 such as described in FIG. 1.

In one exemplary embodiment, as shown schematically in FIG. 2, the new cell geometry may be achieved by simply reversing the polarity of the anode and the cathode of a prior-art electrolysis cell 10 as illustrated in FIG. 1 in order to decrease the current density on the anode. Accomplishing this may be done by simply reversing the wiring of the cathode 12 and the anode 18 to the DC power source 11 to form a new electrolysis cell 110 as shown in one exemplary embodiment in FIG. 2. As such, the former cathode 12 becomes the new anode (shown as 118 in FIG. 2), and the former anode 18 becomes the new cathode (shown as 112 in FIG. 2). An insulating material 124 prevents electrical contact between the anode 118 and the cathode 112 and provides a conduit for coupling the new cathode 112 to the DC power source 11. In addition, the hydrogen gas outlet 15 becomes the new oxygen gas outlet 115, while the oxygen gas outlet 16 becomes the new hydrogen gas outlet 116.

The new cathode 112 includes an outer cylindrical surface 112a. Similarly, the new anode 118 includes an inner cylindrical surface 118a, wherein the surface area of the inner cylindrical surface 118a may be substantially greater than the surface area of the outer cylindrical surface 112a. This therefore decreases the current density and overvoltage on the new anode 118. As it is known that anodic oxygen evolution is the rate limiting step in the electrolysis of water, an increased efficiency may therefore be realized as a result of the increased anode surface area.

In addition, the total volume of the new anode chamber 134 (i.e. the former cathode chamber 36 in FIG. 1) is now greater than the total volume of the new cathode chamber 136 (i.e. the anode chamber 34 in FIG. 1). A larger volume within the anode chamber 134 relative to the cathode chamber 136 will reduce the effects of hydrogen permeation through the membrane 32 from the cathode chamber 136 to the anode chamber 134, a phenomenon that may lead to the "burning" of hydrogen in nearly pure oxygen in the anode chamber 134, wherein such "burning" may adversely affect associated elastomer containing supply lines coupled to the oxygen gas outlet and therefore lead to premature failure of the electrolysis cell 10 as shown in FIG. 1. Lowering the hydrogen gas concentration in the oxygen contained within the anode chamber 134 will also allow the electrolysis cell 110 to operate at higher pressures than the conventional cell 10 without fear of this "burning" effect.

In another related exemplary embodiment to FIG. 2, the surface area of the inner cylindrical surface 118a may be further increased, without affecting the overall shapes and sizes for the cell 110, by introducing irregular shapes to the inner cylindrical surface 118a that are designed to increase the surface area of the anode 118 relative to the surface area of the cathode 112. By implication, this may provide slightly increased cell efficiency for the same reasons as provided above. One exemplary method may be to score or otherwise etch the inner cylindrical surface 118a. Another exemplary method may be to introduce a mesh-like network to the outer cylindrical surface. In still another exemplary embodiment, a catalyst (not shown) may be coated onto the inner cylindrical surface 118a to lower the activation overvoltage $\eta_a$. Two exemplary catalytic materials that may be coated to the anode 118 include finely divided platinum (Pt) and ruthenium dioxide ($RuO_2$).

In still another related exemplary embodiment to FIG. 2, the surface area of both the outer cylindrical surface 112a and the inner cylindrical surface 118a may be further increased, without affecting the overall shapes and sizes for the cell 110, by introducing irregular shapes to both the outer cylindrical surface 112a and the inner cylindrical surfaces 112a and 118a. This may result in a slight increase in the relative surface area of the inner cylindrical surface 118a relative to the outer cylindrical surface 112a, which may provide slightly increased cell efficiency for reasons provided above, as well as a respective increase in hydrogen and oxygen evolution associated with the increased relative surface areas. One exemplary method may be to score or otherwise etch the inner cylindrical surface 118a. Another exemplary method may be to introduce a mesh-like network to the inner cylindrical surfaces 112a and 118a.

To fully appreciate the increases in cell efficiencies as described in the exemplary embodiment of FIG. 2 relative to FIG. 1, a theoretical calculation of the cell efficiencies is provided below in Example 1.

Example 1

To illustrate the increase in cell efficiency in the cell 110 of the exemplary embodiment of FIG. 2 versus the cell 10 of FIG. 1, a theoretical calculation of various cell efficiencies may be performed with the assumption of equal sized cells 10, 110. Moreover, the sizing of the components was based on measurements performed on the Avalence Hydrofiller 50-6500-50RG system as described above.

Thus, the length (l) of the cells 10, 110 may be set to approximately 1219 millimeters. The inner diameter of the outer pressure vessel cylinder (i.e. the inner cylindrical surface 12a of the cathode 12 in FIG. 1 and the inner cylindrical surface 118a of the anode 118 of FIG. 2) may be about 42.9 millimeters, and thus a calculated surface area may be about 1640 square centimeters. The outer diameter of the conductive center post (i.e. the outer cylindrical surface 18a of the anode 18 in FIG. 1 and the outer cylindrical surface 112a of the cathode 12 in FIG. 2) may be about 17.5 millimeters, and thus the calculated active surface area is about 670 square centimeters. The ratio of relative surfaces areas (cathode to anode in FIG. 1 and anode to cathode in FIG. 2) is thus approximately 2.45. Given that current densities are inversely proportional to surface areas, one may expect that the cathode current density is about 2.45 times less than the anode current density in FIG. 1, while the anode current density is about 2.45 times less than the cathode current density in FIG. 2.

Also, wherein the thickness of the annular plastic cell membrane 32 is about 4 millimeters, an inner compartment size volume (i.e. the volume of the cathode chamber 36 in FIG. 1 and the anode chamber 134 in FIG. 2) and outer compartment size volume (i.e. the volume of the anode chamber 34 in FIG. 1 and the cathode chamber 136 in FIG. 2) may also be calculated to be about 0.51 liters and 0.72 liters, respectively, which gives an outer compartment volume to inner compartment volume ratio of about 1.41. In other words, the outer compartment size volume is about 41 percent larger than the smaller inner compartment size volume.

Using a model of alkaline electrolyzers developed by Ulleberg ("Modeling of advance alkaline electrolyzers: a system simulation approach", Ulleberg, O., International Journal of Hydrogen Energy, 2003, 28: 21-33), the operating voltage as a function on the operating current density can be calculated, and the components of the overvoltage can be separated. The operative equation to describe the electrolyzer operating voltage, $V_{oper}$, is:

$$V_{oper}=V_{rev}+((r1+r2*T)*J)+s*\log((t1+t2/T+t3/T^2)*J)+1)$$ Eq. 7 where $V_{rev}$ is the reversible voltage (1.23 V), J is the current density ($mA/cm^2$), r1 and r2 are terms describing the ohmic overvoltage and S, t1, t2, and t3 are terms describing the activation and concentration overvoltages, and T is the electrolyzer temperature. Using the values of the constants derived by Aurora ("Modeling and control of a solar hydrogen fuel system for remote locations", P. Aurora, Master's Thesis, University of Massachusetts, Lowell, Mass. 2003) and listed in Table 2, FIG. 3 was prepared.

TABLE 2

Values of the coefficients in Eq. 7, from Aurora.

| Parameter | Value | Units |
|---|---|---|
| r1 | 8.15E−05 | ohm $m^2$ |
| r2 | −2.75E−07 | ohm $m^2$ °$C.^{-1}$ |
| s | 0.167 | V |
| t1 | 0.372 | $A^{-1} m^2$ |
| t2 | 7.424 | $A^{-1} m^2$ ° C. |
| t3 | 245.5 | $A^{-1} m^2$ ° $C.^2$ |
| $V_{rev}$ | 1.23 | V |
| T | 60 | ° C. |

Figure 3:
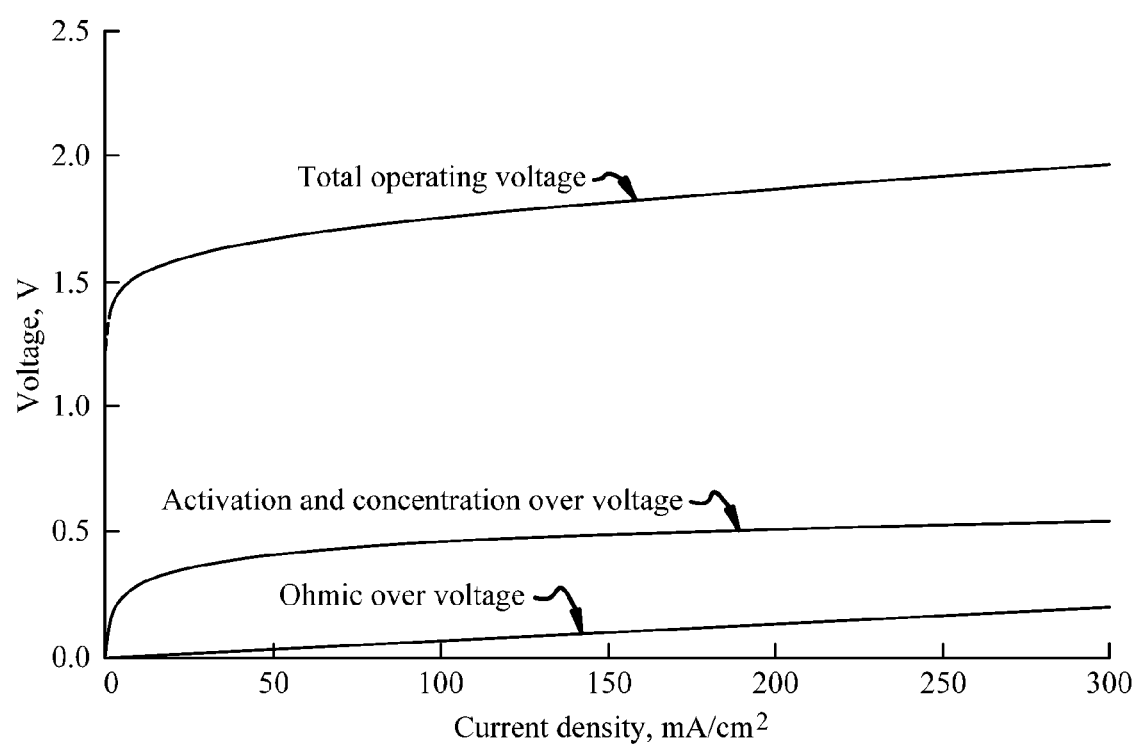
FIG. 3 is a voltage versus current density graph at 60 degrees Celsius (° C.) for the electrolysis cell of FIGS. 2A and 2B.

FIG. 3 utilized a temperature of 60° C., which is believed to be the operating temperature for the Avalence Design similar to that of FIG. 1. The overvoltage due to activation and concentration effects can be reduced by reducing the current density at the anode, where the OER takes place. In water electrolysis, most of the overvoltage is due to the OER, and reducing the current density at the anode reduces the OER overvoltage as shown in FIG. 3.

At an anode current density of 120 mA/cm² (roughly believed to correspond to the design maximum for the Avalence electrolyzer cell of FIG. 1) the overvoltage due to combined activation and concentration effects is 0.47 V. If the polarity of the anode and cathode were reversed, as in FIG. 2, the anode current density would be reduced from approximately 120 mA/cm² to approximately 50 mA/cm². The reduction in current density is due to the larger anode surface area 118a in a reversed-polarity system. Based on Eq. 7, this reduction in the current density would reduce the overvoltage to 0.41 V. Thus, reversing the anode and cathode configuration in the Avalence electrolyzer cell of FIG. 1 as proposed in the alternative electrolysis cell 110 of FIG. 2 will lower the $V_{oper}$ for a given current density (hydrogen production) by 0.06 V. The same ionic current will be flowing through the KOH electrolyzer 17, so this overvoltage ($\eta_{ir}$) will not be affected.

At reduced current densities, such as would occur with a reversal in the wiring that we propose, the activation and concentration overvoltage (polarization) would be reduced, increasing the efficiency. Using Eq. 4 one can compute how reducing the overvoltage would affect the electrolyzer electric to hydrogen efficiency.

The electrolyzer $V_{oper}$ at a current density, J, of 120 mA/cm² would be predicted to be 1.78 V, corresponding to an efficiency of 70.4% (based on the H₂ LHV). Decreasing the current density at the anode to 50 mA/cm² by increasing reversing the cell polarity (increasing the anode surface area by a factor of 2.45) would be expected to decrease the operating voltage to 1.715 V corresponding to an efficiency of 73.1%. Thus, this simple operation would be expected to increase the electrolyzer efficiency from 70.4% to a value of 73.1%. This improvement is relatively insensitive to changes in the electrolyzer temperature. For example, at a temperature of 20° C., the efficiency will increase form a value of 67.6% to 70.0% for the original and reversed electrode assemblies.

One potential issue with the Avalence electrolysis cell 10 similar in configuration to FIG. 1 may be the contamination of the oxygen produced at the anode 18 by hydrogen, produced at the cathode 12, crossing through the cell membrane 32. This may be particularly relevant at high pressure (i.e. at pressures approaching 5000-10000 psig) where relatively small amounts of H₂ crossover (approximately 3-6% H₂ in the O₂) into the high-pressure O₂ produces mixtures in which the two gases combine exothermically, depending on the temperature and surface conditions. The resulting heat can lead to failure of the elastomeric hoses carrying the O₂ out of the electrolysis cells 10 from the outlet 16. The issue may be exacerbated at high-pressure and high-temperature, since both increase the gas diffusion rate. Hydrogen diffuses through membranes faster than any other gas. Depending on the pressure and temperature, when the H₂ concentration in the O₂ reached about 4%, the H₂ combines exothermically with the O₂, and the heat released causes failure of the elastomeric hoses at the top of the cell. Thus, even though most of the O₂ produced by the electrolysis is vented through the outlet 16 in FIG. 1 (outlet 115 in FIG. 2), it must maintain a purity with respect to H₂ concentration sufficient to prevent the H₂—O₂ exothermic reaction at high temperatures (the H₂ and O₂ pressures are always nearly equal on their respective cell compartments).

The hoses (not shown) exiting the tops of the cells 10 through outlets 15, 16 and transporting the gases out of the cell must be non-metallic so that current does not flow around the cell (a short circuit between the anode and cathode) which would result in no electrolysis in the cell. A person of ordinary skill recognizes that allowing higher operation pressures as well as higher "turn-down ratios" (operation over wider range of hydrogen production rates) may be achieved if the gas permeation through the cell membrane could be reduced.

The Avalence Hydrofiller 50-6500-50RG system similar to FIG. 1, and as described in U.S Application No. 2007/0151865, uses a technique to very carefully balance the H₂ and O₂ pressures in their respective H₂ and O₂ cell compartments over a wide range of system pressures, from atmospheric to 6500 psi. That is, the pressure differential between the H₂ and O₂ sides of the system is maintained near zero. However, there is still a driving force for the two gases to mix by permeating through the cell membrane.

The mechanism and driving force for the permeation phenomenon is as follows. First, a small quantity of each gas dissolves into the porous membrane 32, H₂ on one side, O₂ on the other. It could come from the gas bubbles in the cell membrane 32 or from the gas that dissolves into the electrolyte 17. The permeation of hydrogen through the cell membrane 32 is driven by the concentration gradient across the membrane. There is little or no H₂ on the O₂ side of the cell and vice versa there is little or no O₂ on the H₂ side of the cell (FIG. 1). Thus, the chemical potential of hydrogen is high on the H₂ side and low on the O₂ side. Therefore, even though the Avalence Hydrofiller 50-6500-50RG system is designed to minimize the pressure difference on the H₂ and O₂ sides of the system, it does not remove the chemical potential driving force for gas exchange.

From Barbir ("PEM Fuel Cells: Theory and Practice", Associated Press 2005), the gas permeation rate is:

$$R_{gas} = P*A*p/t \qquad \text{Eq. 8}$$

where $R_{gas}$ is the permeation rate, P is the membrane permeability for a given gas, A is the membrane area, p is the gas pressure, and t is the membrane thickness. The permeability, P, is the product of the gas diffusivity, D, and solubility, S, in the membrane:

$$P = D*S \qquad \text{Eq. 9}$$

Thus, permeability is the product of a kinetic factor (the diffusion coefficient) and a thermodynamic factor (the solubility coefficient). The diffusion of a gas through a membrane is driven by an irreversible process (the transfer of the gas) which leads to an increase in entropy. Gases spontaneously diffuse from regions of high concentration (chemical potential) to regions of low concentration. In summary, even though the Avalence Hydrofiller 50-6500-50RG system balances the H₂ and O₂ pressures so that the membrane does not have to support a high pressure differential, there will still be the potential for gas diffusion through the membrane leading to contamination of the respective gas compartments. Due to the high diffusion rate of hydrogen, it is not surprising that the H₂ passes through the cell membrane and contaminates the O₂, rather than vice versa (O₂ crossover into the H₂).

From an analysis of Eq. 8, one can deduce that the permeation rate of the gas through the cell membrane will increase with increasing pressure differential (p) across the membrane. In addition, the permeation rate of the gas will decrease with increasing cell membrane thickness (t). Also, the permeation rate of the gas will increase with an increasing cell membrane area (A).

Reversing the cell polarity (FIG. 1 vs. FIG. 2) will automatically reduce the membrane area available to the hydrogen and will expand the volume that the H₂ diffuses into, both of which will tend to reduce the amount of $H_2$ in the $O_2$. The inner cell membrane 32 surface area, based on an inner diameter of 29 mm, is 1110 cm², and the outer cell membrane 32 surface area, based on a membrane outer diameter of 33 mm, is 1260 cm². Thus, reversing the cell polarity, so the $H_2$ is produced in the inner cell chamber, will result in a slight (14%) reduction in the membrane surface area, and will reduce $H_2$ permeation through the cell membrane and into the outer $O_2$ chamber (Eq. 8). Also, the $H_2$ will be diffusing into a chamber with 41% greater volume (Table 1), so this will also tend to reduce the $H_2$ concentration in the $O_2$ for a given permeation rate. In summary, changing the polarity of the electrolyzer cell from the arrangement in FIG. 1 to the arrangement in FIG. 2 will tend to mollify the problem of $H_2$ build-up, and the associated exothermic heat buildup generated by the reaction of $H_2$ and $O_2$, in the $O_2$ cell compartment. This may allow the electrolyzer cell to operate at higher pressures than the prior art electrolyzer of FIG. 1 without adversely affecting elastomeric containing components associated with the electrolyzer, including elastomeric hoses coupled to the tops of the cells 10 through outlets 15, 16.

The above description of embodiments of the invention is merely exemplary in nature and, thus, variations thereof are not to be regarded as a departure from the spirit and scope of the invention.

What is claimed is:

1. A method for increasing the efficiency of a high-pressure electrolysis cell having an anode and a cathode defining an interior portion there between, the method comprising:
   providing a high-pressure electrolysis cell configured such that the electrode area of the anode is substantially larger than the electrode area of the cathode;
   providing a liquid electrolyte comprising water in said interior portion;
   electrolyzing the water by operating said cell by connecting said anode and cathode to a direct current power source having a positive terminal and a negative terminal; wherein the negative terminal is connected to the cathode and the positive terminal is connected to the anode; and the anode has a substantially larger electrode area than the electrode area of the cathode to produce hydrogen gas at said cathode and oxygen gas at said anode, and
   wherein said cell further comprises a cell membrane disposed between the anode and the cathode to define an anode chamber between the anode and the membrane, and a cathode chamber between the cathode and the membrane, and wherein the volume of the anode chamber is substantially larger than that of the cathode chamber.

2. The method of claim 1 wherein the surface of the anode is scored or etched.

3. The method of claim 1, wherein the anode includes a mesh-like network.

4. The method of claim 1, wherein the anode comprises a catalyst disposed on the surface of the anode, said catalyst being selected from the group consisting of finely divided platinum and ruthenium oxide.

5. A method comprising:
   providing an electrolysis cell comprising a pressure vessel cylinder having a conductive center post; an anode disposed on the inner cylindrical surface of the vessel, a cathode disposed on the outer cylindrical surface of the post, an annular cell membrane disposed between the anode and the cathode to define a cathode chamber between the cathode and the membrane and an anode chamber between the anode and the membrane, and a liquid electrolyte comprising water provided in the cathode chamber and the anode chamber;
   electrolyzing the water by operating said cell by connecting the anode and cathode to a direct current power source having a positive terminal and a negative terminal and wherein the negative terminal is connected to the cathode and the positive terminal is connected to the anode; said anode having a substantially larger electrode area than the electrode area of the cathode to produce hydrogen gas at said cathode and oxygen gas at said anode;
   wherein the cell is configured to provide an anode chamber volume substantially larger than the cathode chamber volume.

6. The method as set forth in claim 5, wherein said anode further comprises a catalyst disposed on its surface, and wherein said catalyst comprises a finely divided platinum or ruthenium oxide.

7. The method as set forth in claim 5, wherein the ratio of the anode chamber volume to the cathode chamber volume is about 1.41 to 1.

8. The method as set forth in claim 5, where the ratio of the anode electrode area to the cathode electrode area is about 2.45 to 1.

9. A method for increasing the efficiency of a high-pressure electrolysis cell having an anode and a cathode defining an interior portion there between, the method comprising:
   providing a high-pressure electrolysis cell configured such that the electrode area of the anode is substantially larger than the electrode area of the cathode;
   providing a liquid electrolyte comprising water in said interior portion;
   electrolyzing the water by operating said cell by connecting said anode and cathode to a direct current power source having a positive terminal and a negative terminal and wherein the negative terminal is connected to the cathode and the positive terminal is connected to the anode; said anode having a substantially larger electrode area than the electrode area of the cathode to produce hydrogen gas at said cathode and oxygen gas at said anode,
   operating said cell at a pressure between 5000 and 10000 Psig;
   wherein said cell further comprises a cell membrane disposed between the anode and the cathode to define an anode chamber between the anode and the membrane, and a cathode chamber between the cathode and the membrane, and wherein the volume of the anode chamber is substantially larger than that of the cathode chamber and the membrane surface area in the cathode chamber is about 14% smaller than the membrane area in the anode chamber.

* * * * *